Figure 4:
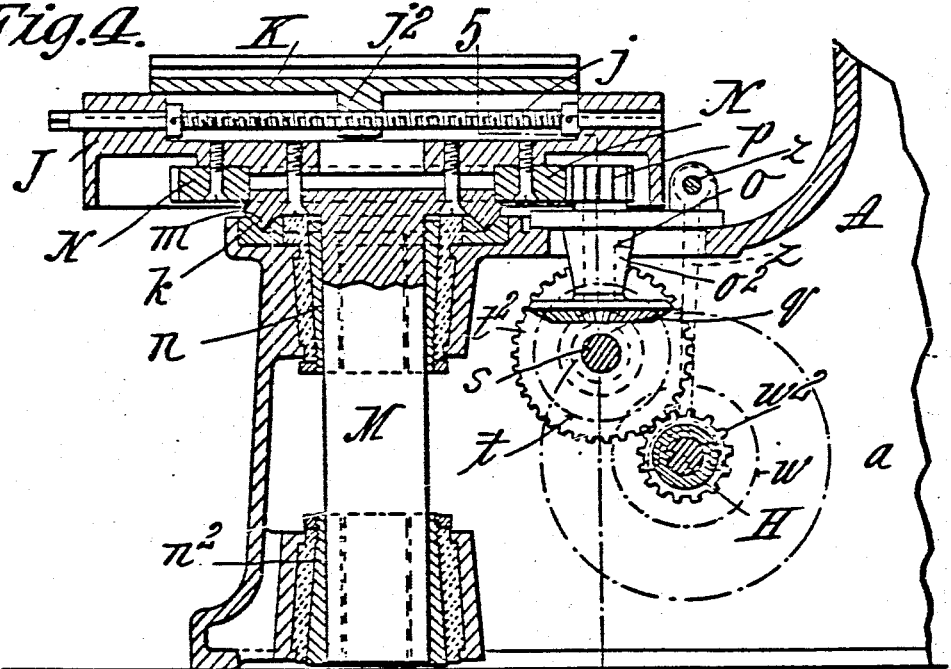

E. A. CHAMBERLIN.
BORING OR REAMING AND GRINDING MACHINE.
APPLICATION FILED JULY 10, 1906.
898,966.
Patented Sept. 15, 1908.
3 SHEETS—SHEET 1.
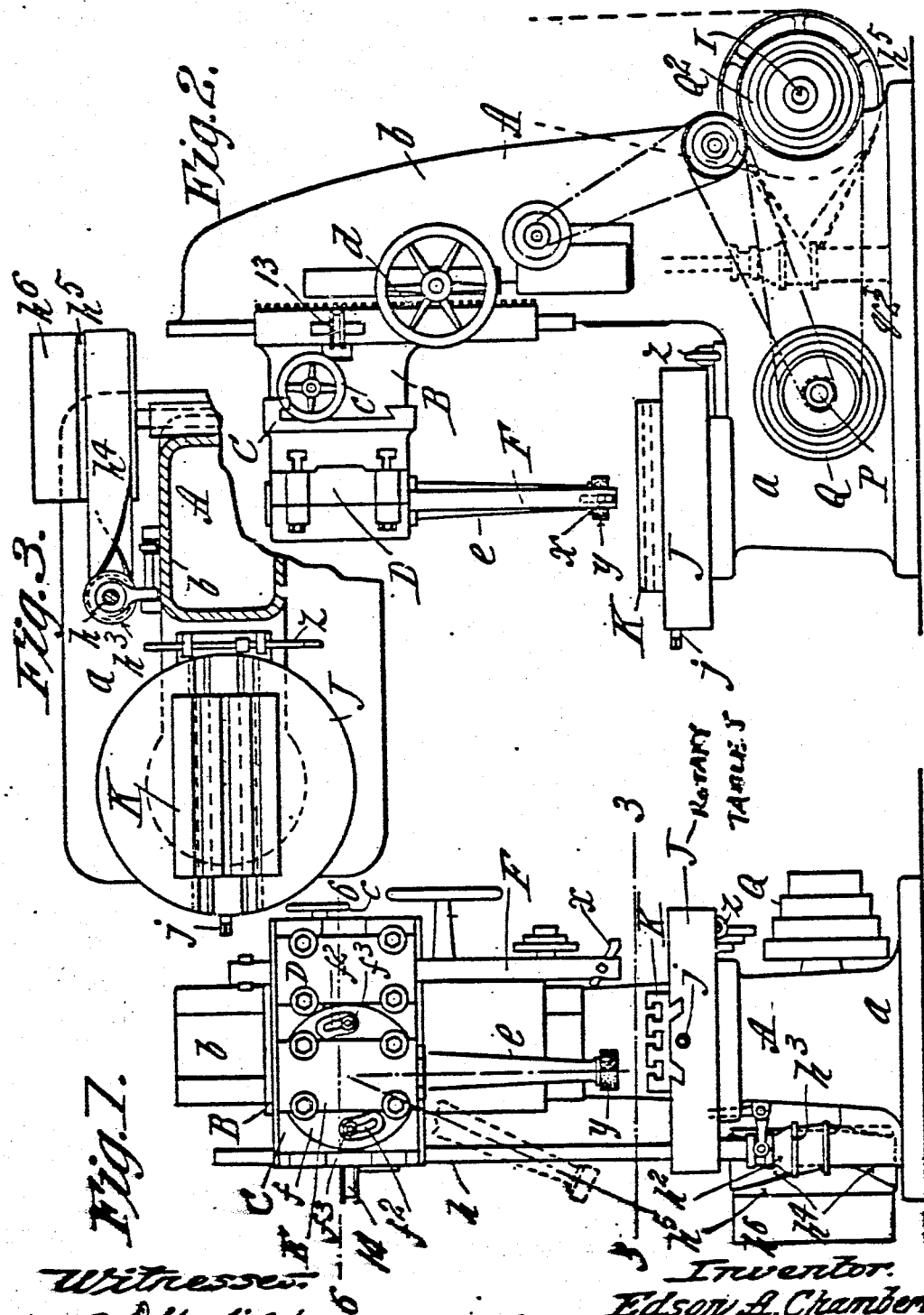

E. A. CHAMBERLIN.
BORING OR REAMING AND GRINDING MACHINE.
APPLICATION FILED JULY 19, 1906.

898,966.

Patented Sept. 15, 1908.
3 SHEETS—SHEET 2.

Witnesses:

Inventor
Edson A. Chamberlin,
by Wm. S. Bellows
Attorney.

E. A. CHAMBERLIN.
BORING OR REAMING AND GRINDING MACHINE.
APPLICATION FILED JULY 10, 1908.
898,966.
Patented Sept. 15, 1908.
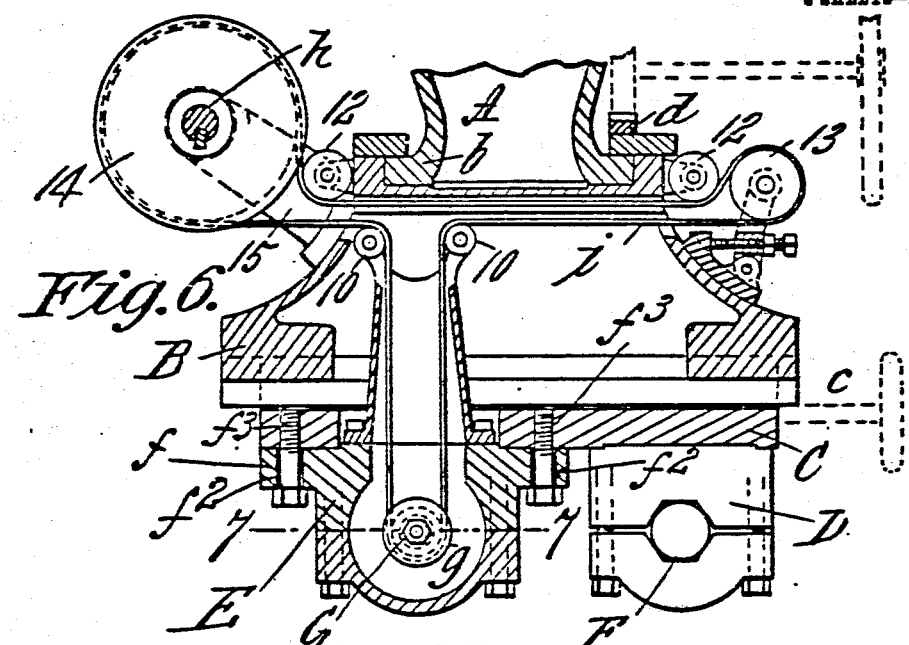
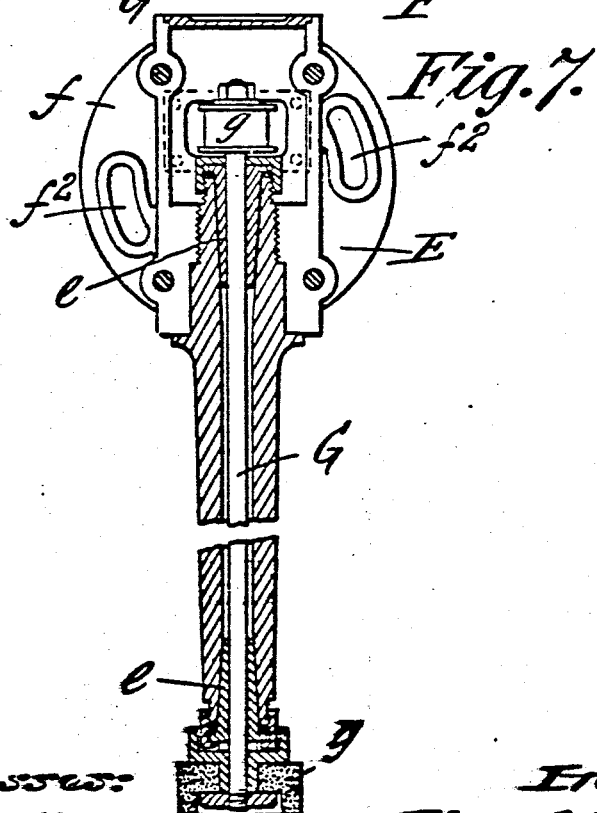

athe, Pulley & wheel.

UNITED STATES PATENT OFFICE.

EDSON A. CHAMBERLIN, OF WORCESTER, MASSACHUSETTS, ASSIGNOR OF ONE-THIRD TO JAMES H. WYLIE AND ONE-THIRD TO FREDERICK S. WYLIE, OF HOLYOKE, MASSACHUSETTS.

BORING OR REAMING AND GRINDING MACHINE.

No. 898,966.     Specification of Letters Patent.     Patented Sept. 15, 1908.

Application filed July 10, 1906. Serial No. 325,530.

*To all whom it may concern:*

Be it known that I, EDSON A. CHAMBERLIN, a citizen of the United States of America, and resident of Worcester, in the county of Worcester and State of Massachusetts, have invented certain new and useful Improvements in Boring or Reaming and Grinding Machines, of which the following is a full, clear, and exact description.

This invention relates to a machine having combined therein means for both boring or reaming, and grinding, the same being available on such work, for instance, as that of boring or reaming out an engine cylinder and grinding the hole or cylindrical chamber therein.

The object of the invention is to provide a machine of simple and practical character which is capable of convenient and satisfactory employment for boring, reaming, or turning, and also for thereafter grinding the internal wall of the part in which the hole or chamber therein has been bored, reamed, or turned.

In the present machine the table on which the work is supported and held is rotatable, and the spindle or bar carrying the tool for internally boring, reaming or turning the cylinder or other part is non-rotatable on a carrying head therefor, which head, however, has both a vertical feed and a cross feed, as usual variously in planing, drilling and grinding machinery; and the said carrying head has the spindle of the driving wheel mounted thereon in such a manner that such spindle may be rotated, preferably, in a direction the reverse from the rotation of the work table, and may be swung away from a vertical position directly over the work table, off to one side to leave unobstructed a space for the work and for the reaming or other tool working therewithin.

The invention resides in a machine of the character described, and for the purpose indicated,—and which machine has many parts and characteristics which are of common employment,—in means for mounting the supporting bar or non-rotatable spindle and the rotatable grinding spindle both on one feed head with means for acquiring the rotation of the grinding spindle, and also means for transversely swinging the grinding spindle away from its working position without disconnection from, or interference with, the spindle rotating means.

The invention further resides in novel means for rotating the work table at various speeds, as may be desired, and in the means for changing such speeds of rotation.

The invention furthermore resides in the provision on the rotary work table of a work holding slide, and means for positioning such slide horizontally on the table proper; and further invention is to be found in various constructions, arrangements and combinations of parts as hereinafter described.

The improved machine is illustrated in the accompanying drawings, in which,—

Figure 5:
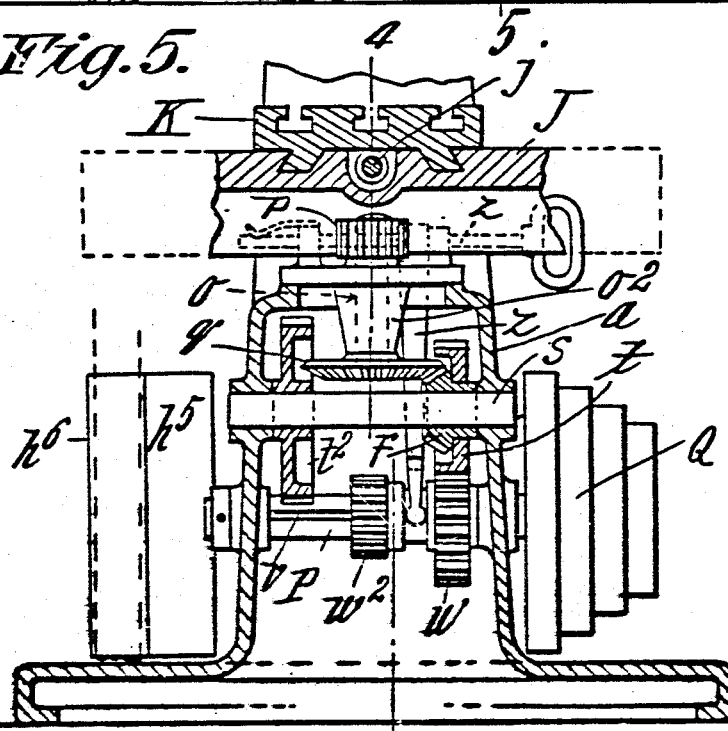

Figure 1 is a front elevation. Fig. 2 is a side elevation. Fig. 3 is a plan view of so much of the machine as may be seen below the plane indicated by line 3—3, Fig. 1. Fig. 4 is a central vertical sectional view as taken from front to rear through the lower portion of the machine, drawn on a larger scale than the preceding views. Fig. 5 is a sectional view as taken at right angles to Fig. 4, and as indicated by the section line 5—5. The section line 4—4, on Fig. 5 indicates the plane on which Fig. 4 is taken. Fig. 6 is a horizontal sectional view as taken on line 6—6, Fig. 1. Fig. 7 is a vertical sectional view through the bearings for the grinding spindle, as taken on line 7—7, Fig. 6.

Similar characters of reference indicate corresponding parts in all of the views.

In the drawings,—A represents the somewhat heavy and massive cast iron frame of the machine comprising a widened base portion $a$ and rear standard $b$ fitted about which is a vertically movable head B for which a vertical feed mechanism $d$ of any usual or approved description is provided.

The main head B has a transversely and horizontally slidable head C for which the hand wheel $c$ indicates a portion of the cross feed of a usual kind therefor.

The secondary head C has mounted thereon a still further head or support D for the non-rotatable spindle or bar F which carries at its lower end a suitable tool $x$ for reaming, boring, or turning. The said secondary head also carries a still further head E supporting bearings $e$ for the rotatable spindle G, which at its lower end carries a grinding wheel $y$; the said head E has a substantially circular back or attachment plate $f$ with concentric arc-shaped slots $f^2$ through which the clamping bolts or screws $f^3$ are passed, the same also extending with a screw engagement into the head C. By loosening the said screws the head and spindle carried thereby may be positioned as shown in full lines in Fig. 1, or as shown by dotted lines, swung off to one side.

The grinding wheel spindle supported for rotation by the head E has a pulley $g$ affixed at its upper end, and the primary head B, which is cored out and made hollow, has supports for belt guiding sheaves 10, 10, 12, 12, and 13, and the belt driving pulley 14 on a bracket 15 which is formed as a part of, and moves up and down with, such vertically moving feed head B.

The belt driving pulley 14 is spline engaged with a vertical shaft $h$ adapted to be clutch connected at $h^2$ with a pulley $h^3$ axially alined therewith,—such pulley $h^3$ being driven with a cross belt $h^4$ from a pulley $h^5$ on a driving shaft H for the driving of which a pulley $h^6$ is provided alongside the pulley $h^5$.

By reason of the provision of a somewhat common spline engagement between the belt driving pulley 14 and the vertical shaft $h$, the pulley 14 and spindle driving belt $i$ may have their required vertical movements notwithstanding the fact that the rotary shaft $h$ is immovable in the direction of its axis.

The belt $i$ has the rear course thereof running from round the rear portion of pulley 14 horizontally and transversely in engagement with the pair of opposite sheaves 12, 12, and around the tensioning sheave 13, while the forward course of the belt has between the front edges of pulley 14 and tensioning sheave 13 a forwardly extending loop return engaged around the grinding-wheel-spindle driving pulley $g$, and guided by the pair of small sheaves 10, 10. This arrangement of the driving belt and the supporting and guiding means therefor permits the grinding spindle carrying head to be swiveled on the head C, and also to be moved as one with such head relatively to the main vertical feed head B without interfering with, or without being interfered with by, the spindle driving connections.

J represents the rotary work table.

K represents the work holding slide movable horizontally diametrically crosswise on the rotary work table J,—$j$ representing the screw for adjustably positioning the work holding slide on the rotary table, such screw engaging the depending nut or projection $j^2$ of the slide, the screw being endwise immovable, but rotatable, in horizontal bearings therefor within the thickness of the work table;—and the base portion $a$ of the machine frame is made with an annular V or trough-shaped groove $k$ in which fits a V-shaped annular rib $m$ formed on the underside of a circular flange which is made at the upper portion of an axially vertical rotatable shaft M, which shaft sustains the work table. The said shaft and the rotary work table therewith are caused to run steadily not only by reason of the annular rib and groove engagement $m$, $k$, but also by reason of the upper and lower bearings $n$ and $n^2$ provided within the hollow base portion of the machine frame.

The circular rotary work table J, the flanged upper end of the shaft M, and the annular spur gear N, although separately made, are all rigidly screwed or clamped one to the other, so that to all intents and purposes the parts are as if made as one.

It will be noted that the annular gear N seats against a shoulder in the bottom of the table J, and also against an annular shoulder formed in the flanged end of the shaft. Thus the gear is held, not only by its own screws, but also by the screws connecting the flange and work table, since, by tightening up these screws, the gear is clamped between the flange and table. By this arrangement, a very rigid structure is obtained.

A short vertical shaft $o$ is arranged opposite and parallel with the upper portion of the aforesaid shaft M fitted for rotation in a journal bearing $o^2$; and such shaft has at its upper end a spur pinion gear $p$ which meshes into the gear wheel N affixed at the end portion of the work table; and at its lower end the said short shaft $o$ is provided with a bevel gear wheel $q$ which is constantly in mesh with an axially horizontal bevel gear wheel $r$ affixed on a rotatable horizontal shaft $s$, and which shaft has at different portions thereof spur gear wheels $t$ and $t^2$ of different sizes. Another shaft P is provided somewhat below and parallel with the shaft $s$, the same being driven by the cone pulleys Q which in turn are driven by the belt $q^2$ from the cone pulleys $Q^2$ on the main shaft I of the machine,— on which main shaft the aforementioned pulleys $h^6$ and $h^5$ are provided.

The shaft P is made with a spline $v$, and a pair of hub-united speed changing spur gear wheels $w$ and $w^2$ are slidable along the length of the shaft so that the one $w$ may be in clutch with the gear wheel $t$, and the one $w^2$ out of gear with the gear wheel $t^2$, or vice versa according as the position of these gears is controlled by the shipper device $z$.

Having described the components of the present machine in respect of the arrangements thereof, it will be apparent that one and the same machine, organized as set forth, may be employed both for boring, reaming, or turning and also for grinding the bore or hole in a given piece of work. An engine cylinder, for instance, to be finished is clamped by usual means in an axial vertical position on the slide K of the rotary work table, the work being capable of adjustment in a horizontal line by moving the slide forwardly and rearwardly by means of the screw $j$; and the tool carrying spindle F may be adjusted horizontally or radially relatively to the work by the usual cross feed for the head C; and the tool is fed in a downward direction for working progressively on the constantly rotating cylinder or piece of work by means of the usual vertical feed mechanism of the machine.

As manifest, at the time of using the non-rotatable boring or reaming tool, the head E is swung so as to remove the grinding wheel and the bearing supports for its spindle off to the one side, as indicated in Fig. 1. And when the cylinder or piece to be further finished is to be operated on by the grinding wheel, the latter and its spindle are brought to, and secured in, the axial vertical position, and also brought to presentation properly against the side of the internal wall of the cylinder and fed downwardly until the entire wall height is subjected to the action of the grinding wheel which in practice is caused to rotate reversely from the rotation of the work.

In the foregoing description and in the following claims the terms "vertically movable" and "transversely and horizontally slidable" and equivalent or corresponding terms, are to be understood as used in a relative sense only, being applicable to the arrangement of machine shown in the drawing; and such terms are not to be considered as restrictive, for, obviously if the work table should be disposed to rotate in any plane other than a horizontal one, the arrangement of the other elements would be altered accordingly.

Having thus described my invention what I claim is:

1. In a machine tool, a frame, upper and lower bearings in said frame, a vertical shaft mounted in said bearings, an annular flange at the upper end of said shaft and provided with a V-shaped rib, and an annular seat supported by said frame and adapted to receive said rib and support said shaft.

2. In a machine tool, a frame, a vertical shaft journaled therein and provided at its top with an annular flange, a rotating work table removably secured to said flange, a separate, removable annular driving gear secured to the bottom of said table and clamped between said table and flange, and a pinion meshing with said driving gear, and also journaled in said frame.

3. In a machine tool, a work table, a sliding head disposed above said table, and capable of both transverse and perpendicular adjustment, a fixed and rotatable tool both carried by said head, said rotatable tool being also capable of an angular adjustment on said head.

4. In a machine tool, a rotary work-holding table, a fixed tool arranged above the same, and capable of a plurality of different adjustments, and a rotating tool also arranged above said table, and having angular, vertical, and horizontal adjustments.

5. In a machine tool, in combination, a rotating work-holder, and means for driving the same, a fixed tool, capable of adjustments, mounted above the holder, a revolving tool, and means for driving it, also mounted above said holder, and means whereby said revolving tool may be swung aside, when the fixed tool is in use.

6. In a machine tool, a work table, a rotatable tool arranged above the same, an adjustable head for supporting said tool, an arm carrying said tool and swiveled on said head, said arm also carrying a belt pulley connected to said tool, a driving wheel and a plurality of guide pulleys suitably supported and a driving belt extending from said driving wheel around said belt pulley, and also passing around said guide pulleys, the arrangement being such that said tool carrying arm may be adjusted both vertically and angularly without interfering with the operation of said belt.

Signed by me at Springfield, Mass., in presence of two subscribing witnesses.

EDSON A. CHAMBERLIN.

Witnesses:
Wm. S. Bellows,
G. R. Driscoll.